US012675862B2

(12) United States Patent
Lee et al.

(10) Patent No.: US 12,675,862 B2
(45) Date of Patent: Jul. 7, 2026

(54) ELECTRONIC DEVICE WITH FOCAL LENGTH DETERMINING METHOD

(71) Applicant: Samsung Electronics Co., Ltd., Suwon-si (KR)

(72) Inventors: Sangwon Lee, Suwon-si (KR); Nagyeong Lee, Suwon-si (KR); Hana Lee, Suwon-si (KR); Myungsub Choi, Suwon-si (KR); Hyong Euk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 101 days.

(21) Appl. No.: 18/441,680

(22) Filed: Feb. 14, 2024

(65) Prior Publication Data

US 2025/0069210 A1 Feb. 27, 2025

(30) Foreign Application Priority Data

Aug. 22, 2023 (KR) ........................ 10-2023-0110115

(51) Int. Cl.
| | |
|---|---|
| *G06T 7/00* | (2017.01) |
| *G06T 5/50* | (2006.01) |
| *G06T 5/60* | (2024.01) |
| *H04N 5/265* | (2006.01) |
| *H04N 23/67* | (2023.01) |

(52) U.S. Cl.
CPC .............. *G06T 7/0002* (2013.01); *G06T 5/50* (2013.01); *G06T 5/60* (2024.01); *H04N 5/265* (2013.01); *H04N 23/672* (2023.01); *H04N 23/673* (2023.01); *G06T 2207/20081* (2013.01); *G06T 2207/20084* (2013.01); *G06T 2207/20221* (2013.01)

(58) Field of Classification Search
CPC .................................................. G06T 7/0002
See application file for complete search history.

(56) References Cited

U.S. PATENT DOCUMENTS

2015/0181107 A1 6/2015 Park et al.

FOREIGN PATENT DOCUMENTS

| | | | | |
|---|---|---|---|---|
| CN | 110324532 A | * 10/2019 | ........... H04N 23/959 |
| CN | 115689963 A | 2/2023 | |
| CN | 116567413 A | 8/2023 | |
| JP | 2018-046543 A | 3/2018 | |

(Continued)

OTHER PUBLICATIONS

English translation of CN-110324532-A, Li, 2019 (Year: 2019).*

(Continued)

*Primary Examiner* — James M Hannett
(74) *Attorney, Agent, or Firm* — NSIP Law

(57) ABSTRACT

A method of determining a focal length and an electronic device that performs the method are provided. The electronic device includes a processor, a camera comprising a lens, and a memory configured to store one or more instructions executable by the processor. The processor is configured to receive a plurality of original images with the lens in response to the one or more instructions being executed, generate a composite image based on the plurality of original images, and determine a focal length of the lens by inputting one or more original images of the plurality of original images and the composite image to an autofocus (AF) model.

17 Claims, 7 Drawing Sheets

(56)                    References Cited

FOREIGN PATENT DOCUMENTS

| JP | 6632385 B2 | 1/2020 |
| KR | 10-1888956 B1 | 8/2018 |
| KR | 10-2020-0096027 A | 8/2020 |
| KR | 10-2023-0002774 A | 1/2023 |
| KR | 10-2024-0061539 A | 5/2024 |

OTHER PUBLICATIONS

Extended European Search Report Issued on Jan. 14, 2025, in Counterpart European Patent Application No. 24195522.8 (14 Pages in English).
Helmli et al. "Adaptive Shape from Focus with an Error Estimation in Light Microscopy" *ISPA 2001. Proceedings of the 2nd International Symposium on Image and Signal Processing and Analysis. In conjunction with 23rd International Conference on Information Technology Interfaces* 2001 (pp. 188-193).
Hasinoff et al. "Burst photography for high dynamic range and low-light imaging on mobile cameras" *ACM Transactions on Graphics (ToG)* vol. 35 Number 6. 2016 (pp. 1-12).
Liba et al. "Handheld Mobile Photography in Very Low Light" *ACM Transactions on Graphics*, vol. 38, No. 6, Article 164. Nov. 2019 (pp. 1-16).

* cited by examiner

ELECTRONIC DEVICE WITH FOCAL LENGTH DETERMINING METHOD

CROSS-REFERENCE TO RELATED APPLICATIONS

This application claims the benefit under 35 USC § 119 (a) of Korean Patent Application No. 10-2023-0110115, filed on Aug. 22, 2023, in the Korean Intellectual Property Office, the entire disclosure of which is incorporated herein by reference for all purposes.

BACKGROUND

1. Field

The following description relates to an electronic device with a focal length determining method.

2. Description of Related Art

A camera may automatically perform a focus operation using contrast detection autofocus (CDAF) and phase detection autofocus (PDAF).

The CDAF defines a metric that calculates a contrast in an image, and determines that the camera is in focus at a position of a lens where the contrast is the maximum.

The PDAF, the phase detection method, divides light incident through a lens into two branches, compares them, and determines that the camera is in focus when phases of the two rays of light are the same.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, an electronic device includes a processor; a camera comprising a lens; and a memory configured to store one or more instructions executable by the processor, wherein the processor is configured to: receive a plurality of original images with the lens in response to the one or more instructions being executed; generate a composite image based on the plurality of original images; and determine a focal length of the lens by inputting one or more original images of the plurality of original images and the composite image to an autofocus (AF) model.

The processor may be further configured to calculate an error between an original image of a reference frame selected from the plurality of original images and original images of remaining frames; and generate the composite image based on original images which have the error within a set threshold value and the original image of the reference frame.

The processor may be further configured to calculate the error based on a pixel value of the original image of the reference frame and pixel values of the original images of the remaining frames.

The processor may be further configured to correct the plurality of original images by frame alignment; and generate the composite image based on the plurality of corrected original images.

The AF model may be a convolutional neural network (CNN) that includes a plurality of layers, wherein the CNN may be configured to receive one or more of the plurality of original images and a composite image generated from the plurality of original images, and output a focal length for the composite image.

The AF model may be configured to determine the focal length by detecting a contrast of the composite image, or determine the focal length based on a phase difference of the composite image.

In a general aspect, an electronic device includes a processor; a camera comprising a lens; and a memory configured to store one or more instruction, executable by the processor, wherein the processor is configured to: receive a plurality of original images with the lens in response to the one or more instructions being executed; generate a composite image based on the plurality of original images; and determine a focal length of the lens by inputting the composite image to an autofocus (AF) model.

The processor may be further configured to calculate an error between an original image of a reference frame selected from the plurality of original images and original images of remaining frames; and generate the composite image based on original images which have the error within a set threshold value and the original image of the reference frame.

The processor may be further configured to calculate the error based on a pixel value of the original image of the reference frame and pixel values of the original images of the remaining frames.

The processor may be further configured to correct the plurality of original images by frame alignment; and generate the composite image based on the plurality of corrected original images.

The AF model may b a convolutional neural network (CNN) that comprises a plurality of layers, wherein the CNN is configured to receive one or more of the plurality of original images and a composite image generated from the plurality of original images, and output a focal length for the composite image.

The AF model may be configured to determine the focal length by detecting a contrast of the composite image, or determine the focal length based on a phase difference of the composite image.

In a general aspect, a focal length determining method includes receiving a plurality of original images with a lens; generating a composite image based on the plurality of original images; and determining a focal length of the lens by inputting the composite image to an autofocus (AF) model.

The generating of the composite image may include calculating an error between an original image of a reference frame selected from the plurality of original images and original images of remaining frames; and generating the composite image based on original images which have the error within a set threshold value and the original image of the reference frame.

The calculating of the error may include calculating the error based on a pixel value of the original image of the reference frame and pixel values of the original images of the remaining frames.

The generating of the composite image may include correcting the plurality of original images by frame alignment; and generating the composite image based on the plurality of corrected original images.

The AF model may be a convolutional neural network (CNN), which may include a plurality of layers, and receives one or more of the plurality of original images and a composite image generated from the plurality of original images, and outputs a focal length for the composite image.

The determining of the focal length may include determining the focal length by detecting a contrast of the composite image, or determining the focal length based on a phase difference of the composite image using the AF model.

In a general aspect, a method includes capturing burst images at preset time intervals with an image capturing device including one or more lenses; calculating an error between an original image of a reference frame of the burst images, and original images of remaining frames of the burst images; merging the burst images into a composite image by comparing the calculated error with a set threshold; inputting the composite image to an autofocus (AF) model; and determining a focal length of at least one of the one or more lenses based on an output of the AF model, wherein the AF model is at least one of a machine learning model and a non-machine learning model.

The machine learning model may be a convolutional neural network model, and the non-machine learning model is one of a phase detection auto focus (PDAF) method and a contrast detection auto focus (CDAF) method.

Other features and aspects will be apparent from the following detailed description, the drawings, and the claims.

Figure 1:
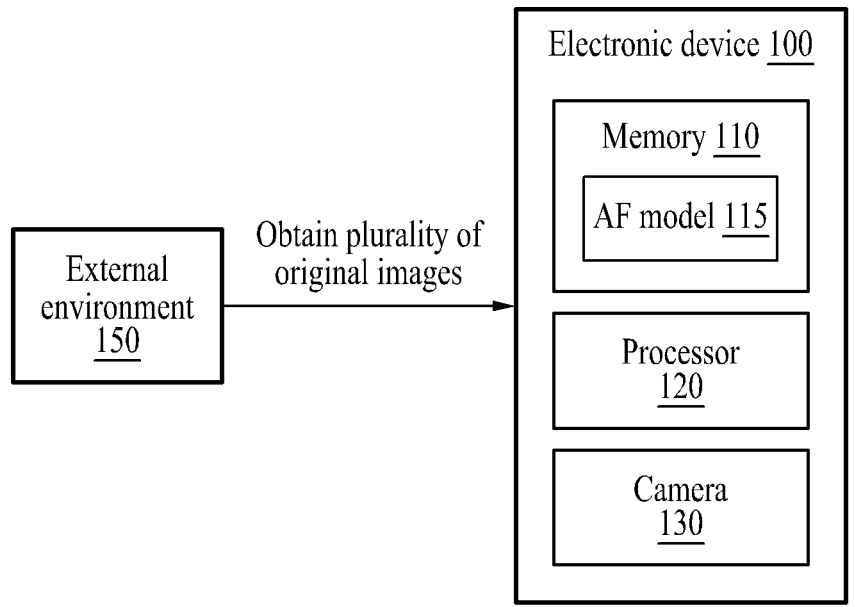
FIG. 1 illustrates an example electronic device, in accordance with one or more embodiments.

Throughout the drawings and the detailed description, unless otherwise described or provided, the same drawing reference numerals may be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences within and/or of operations described herein are merely examples, and are not limited to those set forth herein, but may be changed as will be apparent after an understanding of the disclosure of this application, except for sequences within and/or of operations necessarily occurring in a certain order. As another example, the sequences of and/or within operations may be performed in parallel, except for at least a portion of sequences of and/or within operations necessarily occurring in an order, e.g., a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto. The use of the terms "example" or "embodiment" herein have a same meaning, e.g., the phrasing "in one example" has a same meaning as "in one embodiment", and "one or more examples" has a same meaning as "in one or more embodiments."

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

Throughout the specification, when a component or element is described as being "on", "connected to," "coupled to," or "joined to" another component, element, or layer it may be directly (e.g., in contact with the other component, element, or layer) "on", "connected to," "coupled to," or "joined to" the other component, element, or layer or there may reasonably be one or more other components, elements, layers intervening therebetween. When a component, element, or layer is described as being "directly on", "directly connected to," "directly coupled to," or "directly joined" to another component, element, or layer there can be no other components, elements, or layers intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

FIG. 1 illustrates an example electronic device 100, in accordance with one or more embodiments.

Referring to FIG. 1, the example electronic device 100 may include a memory 110, a processor 120, and a camera 130.

The electronic device 100 may include, for example, various computing devices, such as, but not limited to, a mobile phone, a smartphone, a tablet personal computer (PC), an e-book device, a laptop, a PC, and a server, various wearable devices, such as a smart watch, smart eyeglasses, a head mounted display (HMD), or smart clothes, various home appliances such as a smart speaker, a smart television (TV), and a smart refrigerator, and other devices, such as a smart vehicle, a smart kiosk, an Internet of things (IoT) device, a walking assist device (WAD), a drone, a robot, and the like.

The memory 110 may store various pieces of data used by a component (e.g., the processor 120) of the electronic device 100. For example, the various pieces of data may include a plurality of original images captured by a camera, and a composite image generated using the plurality of original images. The various pieces of data may include, for example, software (e.g., an autofocus (AF) model 115) and input data and/or output data for a command related thereto. The memory 110 may store parameters (e.g., a weight and a bias) of the AF model 115 which will be described below in detail. Model parameters stored in the memory 110 may be loaded into the processor 120 to implement the AF model 115 in the processor 120.

A program may be stored as software in the memory 110, and may include, as examples, an operating system (OS), middleware, or an application.

The processor 120 may be a device configured to control respective operations of components included in the electronic device 100, or process given data, and may be, for example, a central processing unit (CPU). However, the examples are not limited thereto.

According to an example, the processor 120 may include, as examples, hardware components of a main processor and an auxiliary processor (e.g., a central processing unit (CPU), a graphics processing unit (GPU), a neural processing unit (NPU), an image signal processor, or a communication processor and/or a field programmable gate array (FGPA)) that is operable independently of, or in conjunction (or in parallel) with, the main processor.

According to an example, the auxiliary processor may include a hardware structure specified for neural network model processing. A neural network model (e.g., the AF model 115) may be generated through machine learning. For example, the neural network model may be trained by the electronic device 100, a separate training device, or a separate server. The neural network model may be configured to perform, as non-limiting examples, object classification, object recognition, and image recognition by mutually mapping input data and output data in a nonlinear relationship based on deep learning. Such deep learning is indicative of processor implemented machine learning schemes.

Learning algorithms may include, but are not limited to, for example, supervised learning, unsupervised learning, semi-supervised learning, or reinforcement learning. The neural network model may include a plurality of neural network layers. A neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The neural network model may additionally or alternatively include a software structure other than the hardware structure.

For example, the neural network may be, or include, as only examples, a CNN, a RNN, perceptron, feed forward (FF), a radial basis network (RBF), deep feed forward (DFF), a long short term memory (LSTM), a gated recurrent unit (GRU), an autoencoder (AE), a variational autoencoder (VAE), a denoising autoencoder (DAE), a sparse autoencoder (SAE), Markov Chain (MC), a Hopfield network (HN), a Boltzmann machine (BM), a restricted Boltzmann machine (RBM), a Depp belief network (DBN), a deep convolutional network (DCN), a deconvolutional network (DN), a deep convolutional inverse graphics network (DCIGN), a generative adversarial network (GAN), a liquid state machine (LSM), an extreme learning machine (ELM), an echo state network (ESN), a deep residual network (DRN), a differentiable neural computer (DNC), a neural turning machine (NTM), a capsule network (CN), a Kohonen network (KN), and an attention network (AN), as non-limiting examples.

In an example, the camera 130 may capture an external environment 150, and obtain an original image and/or a plurality of original images. In an example, the camera 130 may obtain a plurality of original images according to a set frame during set time. The plurality of original images captured by the camera 130 may be images that are captured at different time points, and may be, for example, burst images captured at preset time intervals. The camera 130 may include one or more lenses. The camera 130 may determine a position of a lens that captures the external environment 150 according to a focal length.

In an example, the plurality of original images may be burst raw image data obtained from a complementary metal-oxide semiconductor (CMOS) image sensor. The plurality of original images may include various pieces of data that may be obtained through the sensor. For example, the plurality of original images may include an image for which a phase difference may be calculated, and a normal image without a phase difference obtained through a dual photodiode (2PD) and a quad photodiode (QPD).

The electronic device 100 may determine a focal length of the lens using the AF model 115. For example, the electronic device 100 may determine the focal length of the lens by inputting one or more original images and/or a composite image to the AF model 115. The electronic device 100 may determine the position of the lens according to the focal length. The electronic device 100 may control the lens of the camera 130 according to the determined position of the lens.

The electronic device 100 may generate a composite image using the plurality of original images. For example, the electronic device 100 may merge the plurality of original images to generate the composite image. The electronic device 100 may generate the composite image based on an average of pixel values at each position of the plurality of original images.

The electronic device 100 may generate the composite image using all or some of the plurality of original images. In an example, the electronic device 100 may generate the composite image by combining original images of a set frame among the plurality of original images. In an example, when original images of 12 frames are obtained, the electronic device 100 may generate the composite image using the original images of the last four frames.

In an example, the electronic device 100 may determine original images to be used to generate the composite image by comparing errors of the plurality of original images with a set threshold. For example, the electronic device 100 may calculate an error between an original image of a reference frame selected from the plurality of original images and original images of the remaining frames. The electronic device 100 may calculate the error as an average of a difference between each pixel value (e.g., intensity) of the original image of the reference frame and each pixel value of the original images of the remaining frames. For example, the electronic device 100 may compare the pixel values of the original images of the remaining frames at the same position as the position of each pixel of the original image of the reference frame.

The electronic device 100 may determine the original images to be used to generate the composite image by comparing the errors between the original image of the reference frame and the original images of the remaining frames with the set threshold. For example, the electronic device 100 may determine original images of frames corresponding to errors within a set range from a smallest error among the errors as the original images to be used to generate the composite image.

For example, the AF model 115 may determine the focal length using one or more original images of the plurality of original images and/or the composite image.

For example, the AF model 115 may determine the focal length according to contrast detection auto focus AF (CDAF) or phase detection auto focus AF (PDAF) using the one or more original images of the plurality of original images and/or the composite image. In an example, CDAF may use the sensor of the camera to detect the contrast between light and dark areas in the images. PDAF may use two sensors located on opposing sides of the camera lens to detect a phase difference of light that enters the lens.

The electronic device 100 may determine the focal length according to the PDAF using the plurality of original images. For example, the electronic device 100 may capture the plurality of original images while changing the position of the lens. The AF model 115 may calculate sharpness of an image using the one or more original images of the plurality of original images captured at a plurality of lens positions, respectively. The AF model 115 may determine a lens position, at which maximum sharpness of the image is obtained, as the focal length.

In an example, the electronic device 100 may capture the plurality of original images while changing the position of the lens, and generate the composite image by combining the plurality of original images captured at each position of the lens. The AF model 115 may determine the position of the lens, at which the maximum sharpness of the image is obtained, as the focal length using the composite image corresponding to each position of the lens.

For example, the electronic device 100 may obtain the plurality of original images including two or more images. The AF model 115 may calculate a phase difference between the two or more images according to the PDAF using one or more of the plurality of original images including the two or more images. The AF model 115 may determine a moving direction and a movement amount of the lens using the calculated phase difference. The position of the lens according to the moving direction and the movement amount of the lens may correspond to the focal length. The electronic device 100 may control the lens according to the moving direction and the movement amount of the lens determined at the position of the lens, at which the plurality of original images are obtained.

The electronic device 100 may generate a composite image including two or more images by combining the plurality of original images including the two or more images. The AF model 115 may calculate a phase difference between the two or more images included in the composite image according to the PDAF. The AF model 115 may determine the moving direction and the movement amount of the lens using the calculated phase difference. The position of the lens according to the moving direction and the movement amount of the lens may correspond to the focal length. The electronic device 100 may control the lens according to the moving direction and the movement amount of the lens determined at the position of the lens, at which the plurality of original images are obtained.

In an example, the AF model 115 may include a model that is trained to output a focal length by inputting one or more of the plurality of original images and/or the composite image. For example, the AF model 115 may be trained to output a focal length by inputting one or more original images of the plurality of original images. For example, the AF model 115 may be trained to output the focal length by inputting the composite image generated using the plurality of original images.

Training data to train the AF model 115 may include one or more of the plurality of original images and/or the composite image. Ground truth of the plurality of original images and the composite image may be determined by various methods. For example, the ground truth of the plurality of original images and the composite image may include a focal length calculated using a depth that is estimated from a multi-view stereo image using a plurality of cameras, or calculated according to the CDAF using the plurality of original images obtained at a plurality of lens positions.

In an example, the AF model 115 may include a CNN, but is not limited to the above examples, and may include various machine learning-based models (e.g., MobileNet-v2, VGGNet, ResNet, MCUNet, etc.). The AF model 115 may also include non-machine learning-based model such as the CDAF and the PDAF.

In an example, the example electronic device 100 may correct the plurality of original images by performing frame alignment on the plurality of original images. The example electronic device 100 may perform regional registration of the plurality of original images using various known methods for image alignment. The electronic device 100 may generate the composite image using the plurality of corrected original images.

When the composite image is generated according to the plurality of corrected original images by performing the frame alignment, an error between the original images of each frame may be reduced. When the plurality of original images are corrected, an error in the focal length output by the AF model 115 may be reduced.

The AF model 115 may reduce the error in the focal length by outputting the focal length using the composite image.

In an example, when the AF model 115 outputs the focal length according to the CDAF or the PDAF, the error in the focal length output by the AF model 115 increases due to a noise and blur of an image with a low illuminance. When the plurality of original images are obtained with the low illuminance and the AF model 115 outputs the focal length using the composite image obtained by combining the plurality of original images, the error in the focal length may be reduced.

In an example, when the plurality of original images are combined, a noise of the composite image may be reduced as shown in Equation 1 below.

$$\mathrm{Var}(\overline{X}) = \mathrm{Var}\left(\frac{1}{n}\sum_{i=1}^{n}X_i\right) = \frac{1}{n^2}\sum_{i=1}^{n}\mathrm{Var}(X_i) = \frac{1}{n^2}n\sigma^2 = \frac{\sigma^2}{n}.$$

Equation 1

In an example, assuming additive white Gaussian noise (AWGN), a variance of a composite image generated using an average of n frames may be reduced to 1/n as shown in Equation 1 above. In Equation 1, $\overline{X}$ may represent a composite image generated using an average of the plurality of original images, $X_i$ may represent an original image of an i-th frame, and $\sigma$ may represent a standard deviation of the plurality of original images.

As described above, when the AF model 115 calculates the focal length of the input image based on the CDAF or the PDAF, the composite image may have a reduced noise compared to the plurality of original images, and thus, the error in the focal length output by the AF model 115 may be reduced.

Table 1 below is a table showing an accuracy of the focal length measured using a laser point and the focal length calculated by a first method, a second method, and a third method.

TABLE 1

| Total illuminance | =0 | <=1 | <=2 | <=4 | MAE | RMSE |
|---|---|---|---|---|---|---|
| First method | 0.319 | 0.645 | 0.787 | 0.922 | 1.652 | 2.928 |
| Second method | 0.376 | 0.723 | 0.851 | 0.957 | 1.277 | 2.385 |
| Third method | 0.355 | 0.709 | 0.844 | 0.950 | 1.369 | 2.460 |

The first method, the second method, and the third method, as illustrated in Table 1 above, are methods for the AF model 115 to calculate the focal length according to the CDAF.

The first method is a method in which the AF model 115 calculates the focal length using one original image, the second method is a method of calculating the focal length using the composite image generated using the plurality of original images, and the third method is a method of calculating the focal length using the composite image combined using original images having errors less than a set threshold value among the plurality of original images.

As shown in Table 1 above, it may be confirmed that a mean absolute error (MAE) and a root mean square error (RMSE) of the second method and the third method are less than a MAE and RMSE of the first method.

Table 2 below is a table showing the accuracy of the focal length calculated by the first method, the second method, and the third method with a low illuminance.

TABLE 2

| Low illuminance (5 to 10 lux) | =0 | <=1 | <=2 | <=4 | MAE | RMSE |
|---|---|---|---|---|---|---|
| First method | 0.321 | 0.571 | 0.714 | 0.929 | 1.536 | 2.130 |
| Second method | 0.357 | 0.643 | 0.821 | 0.964 | 1.250 | 1.783 |
| Third method | 0.357 | 0.679 | 0.821 | 0.964 | 1.214 | 1.21 |

As shown in Table 2, it may be confirmed that the accuracy of the focal length calculated by the second method or the third method with the low illuminance is higher than the accuracy of the focal length of the first method.

As described above, the electronic device 100 may reduce the error of the focal length by calculating the focal length using the composite image having a reduced noise compared to the plurality of original images.

Even when the AF model is trained based on a machine learning model, the noise of the composite image is reduced compared to the plurality of original images, and therefore, the error of the focal length output by the AF model 115 may be reduced.

In an example, in a process of training the AF model 115, since the accuracy of ground truth calculated using the composite image having the reduced noise may be high, the accuracy of the AF model 115 may be increased.

TABLE 3

| Total illuminance | ==0 | <=1 | <=2 | <=4 | MAE | RMSE |
|---|---|---|---|---|---|---|
| First method | 0.298 | 0.632 | 0.804 | 0.907 | 1.814 | 3.251 |
| Second method | 0.323 | 0.665 | 0.815 | 0.926 | 1.562 | 2.616 |
| Third method | 0.337 | 0.66 | 0.83 | 0.943 | 1.42 | 2.285 |

In Table 3, the first method is a method of using one original image as an input of the AF model 115, and training the AF model 115 using ground truth calculated using the one original image, the second method is a method of using one original image as an input of the AF model 115 and training the AF model 115 using ground truth calculated using a composite image obtained by combining a plurality of original images, and the third method is a method of using a composite image obtained by combining a plurality of original images as an input of the AF model 115 and training the AF model 115 using ground truth calculated using the composite image obtained by combining the plurality of original images.

As shown in Table 3, it may be confirmed that the accuracy of the focal length output using the AF model 115 trained by the third method may be higher than the accuracy of the focal length output using the AF model 115 trained by the first method and the second method.

Figure 2A:
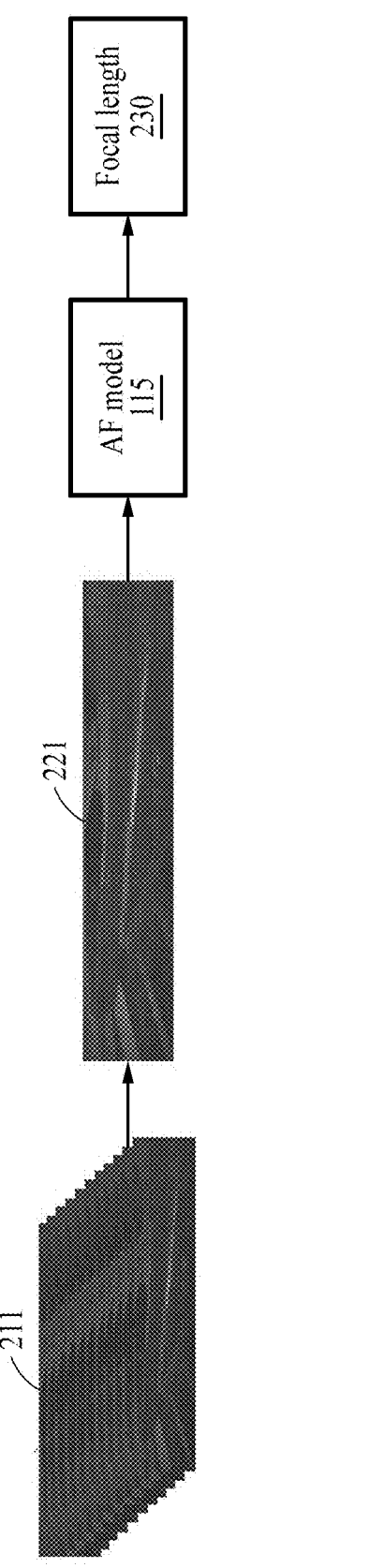
FIGS. 2A and 2B illustrate examples of an operation for an example electronic device to determine a focal length using an autofocus (AF) model, in accordance with one or more embodiments.
Figure 2B:
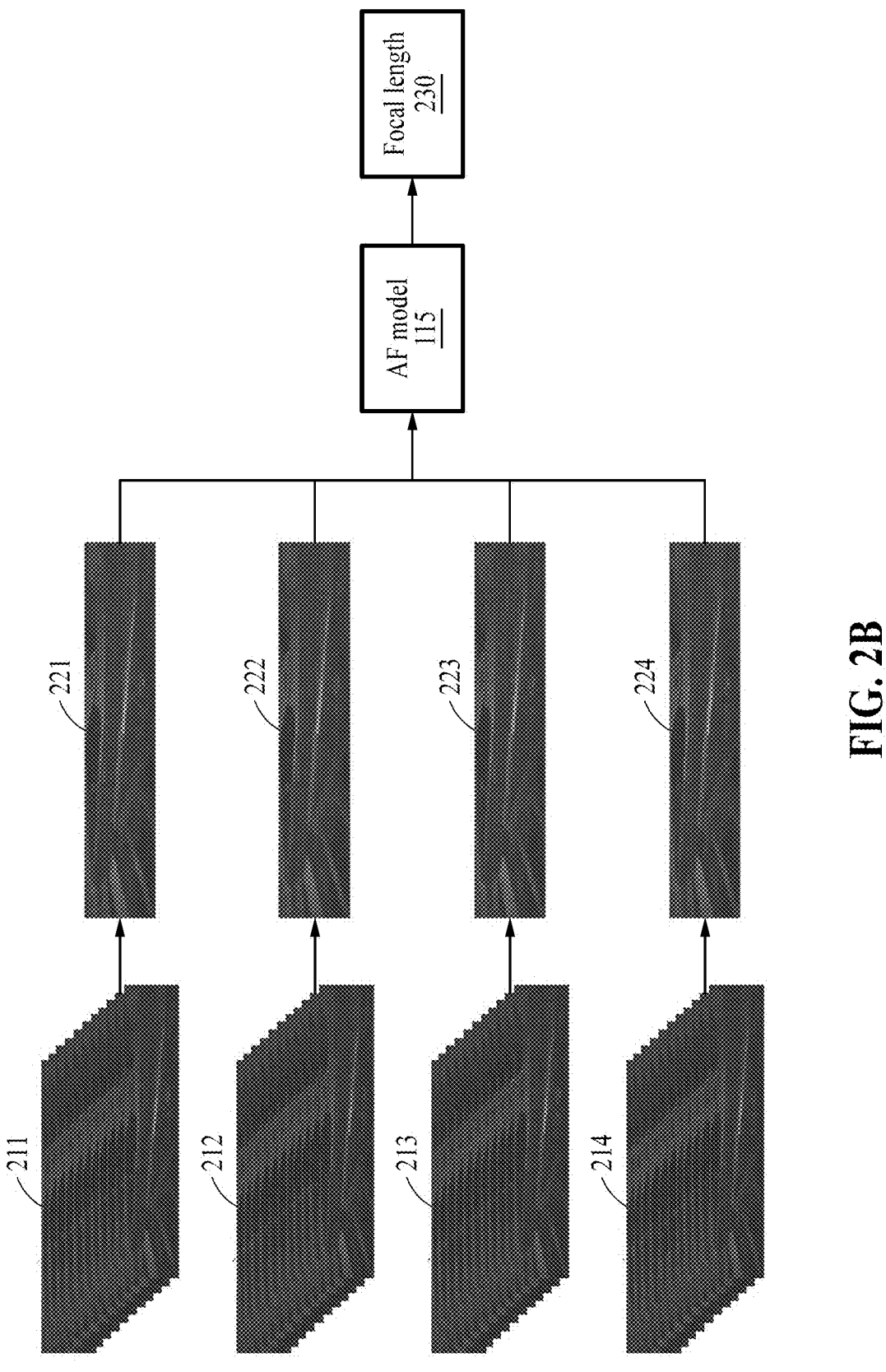

FIGS. 2A and 2B illustrate example operations for the electronic device 100 to determine a focal length 230 using the AF model 115.

Referring to FIG. 2A, the electronic device 100 may obtain a plurality of original images 211 with a camera. The electronic device 100 may generate a composite image 221 based on the plurality of original images 211. The electronic device 100 may input the composite image 221 to the AF model 115 and output the focal length 230.

FIG. 2A illustrates the operation of the electronic device 100 to determine the focal length 230 by inputting the composite image 221 to the AF model 115, but is not limited thereto.

In an example, the electronic device 100 may determine the focal length 230 by inputting one or more original images of the plurality of original images 211, and the composite image 221 to the AF model 115. When the AF model 115 is a machine learning-based model, the AF model 115 may be trained to output the focal length 230 by using one or more original images of the plurality of input original images 211, and the composite image 221.

Referring to FIG. 2B, the electronic device 100 may obtain a plurality of original images 211, 212, 213, and 214 at a plurality of lens positions.

In an example, when the position of the lens is at a first position, the electronic device 100 may obtain the plurality of original images 211, and generate the composite image 221 using the plurality of original images 211 obtained at the first position.

In an example, when the position of the lens is at a second position, the electronic device 100 may obtain the plurality of original images 212, and generate a composite image 222 using the plurality of original images 212 obtained at the second position.

In an example, when the position of the lens is at a third position, the electronic device 100 may obtain the plurality of original images 213, and generate a composite image 223 using the plurality of original images 213 obtained at the third position.

In an example, when the position of the lens is at a fourth position, the electronic device 100 may obtain the plurality of original images 214, and generate a composite image 224 using the plurality of original images 214 obtained at the fourth position.

The electronic device 100 may determine the focal length 230 by inputting the composite images 221, 222, 223, and 224 to the AF model 115.

In an example, the AF model 115 may calculate sharpness of the composite images 221, 222, 223, and 224 corresponding to each position of lens according to the CDAF, and determine the position of the lens at which the maximum sharpness is obtained.

For example, the AF model 115 may be trained to output the focal length 230 by inputting the composite images 221, 222, 223, and 224 obtained by combining the plurality of original images 211, 212, 213, and 214 obtained at each position of the lens (e.g., the first position, the second position, the third position, and the fourth position).

Figure 3:
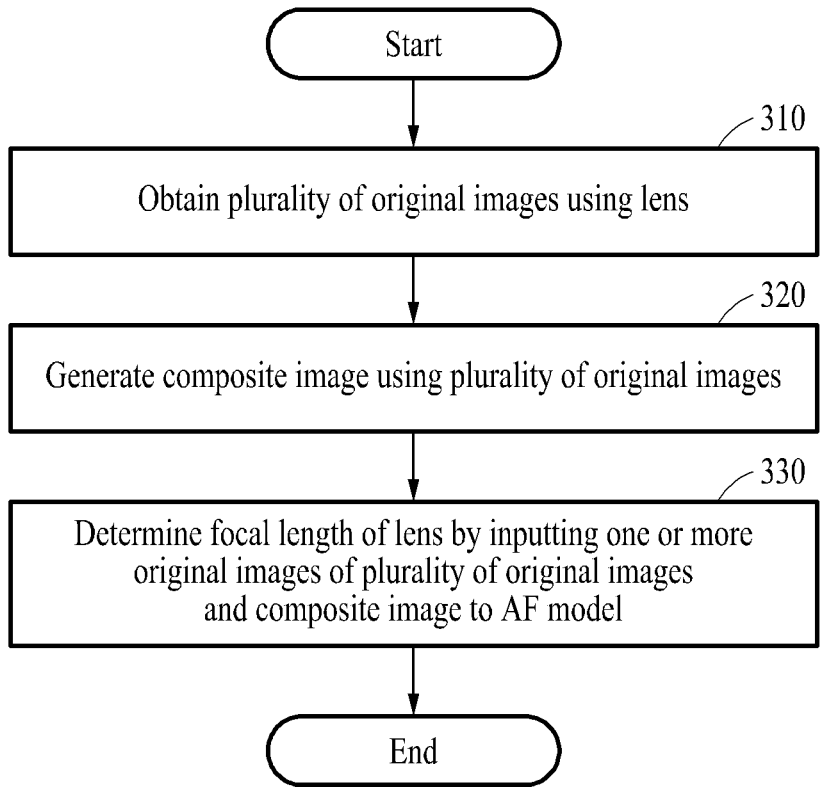
FIG. 3 illustrates an example method of determining a focal length, in accordance with one or more embodiments.

FIG. 3 illustrates an example method of determining a focal length, in accordance with one or more embodiments. The operations in FIG. 3 may be performed in the sequence and manner as shown. However, the order of some operations may be changed, or some of the operations may be omitted, without departing from the spirit and scope of the shown example. Additionally, operations illustrated in FIG. 3 may be performed in parallel or simultaneously. One or more blocks of FIG. 3, and combinations of the blocks, can be implemented by special purpose hardware-based computer that perform the specified functions, or combinations of special purpose hardware and instructions, e.g., computer or processor instructions. In addition to the description of FIG. 3 below, the descriptions of FIGS. 1-2B are also applicable to FIG. 3 and are incorporated herein by reference. Thus, the above description may not be repeated here for brevity purposes. The operations of FIG. 3 may be performed by a processor.

Referring to FIG. 3, in operation 310, the electronic device 100 may obtain a plurality of original images using a lens.

In an example, in operation 320, the electronic device 100 may generate a composite image using the plurality of original images. In an example, the electronic device 100 may generate the composite image using an average of pixel values of the plurality of original images at the same position.

The electronic device 100 may generate the composite image using all or some of the plurality of original images. For example, the electronic device 100 may generate the composite image using a set number of original images (e.g., original images within a set frame from the last frame) among the plurality of original images.

In an example, the electronic device 100 may generate the composite image based on errors between the plurality of original images and a set threshold. The electronic device 100 may calculate an error with original images of remaining frames based on an original image of a reference frame (e.g., the last frame). In an example, the electronic device 100 may calculate the error using an average of differences between a pixel value at each position of the original image of the reference frame and a pixel value at each position of the original image of the remaining frame. The electronic device 100 may set an error with a smallest value among the calculated errors as a reference error. The electronic device 100 may generate the composite image using original images having an error within a set range from the reference error.

In an example, in operation 330, the electronic device 100 may determine the focal length of the lens by inputting one or more original images of the plurality of original images and the composite image to the AF model 115.

In an example, the AF model 115 may determine the focal length using the CDAF method or the PDAF method.

In an example, when the AF model 115 determines the focal length according to the CDAF method, sharpness of the one or more original images of the plurality of original images and the composite image may be calculated. The AF model 115 may calculate the sharpness at the position of the corresponding lens based on the sharpness of the one or more original images and the sharpness of the composite image. In an example, the AF model 115 may calculate the sharpness based on the lens position as an average (or a weighted average) of the sharpness of the one or more original images and the sharpness of the composite image.

The AF model 115 may determine the focal length based on the sharpness calculated at the position of each lens.

In an example, when the AF model 115 determines the focal length according to the PDAF method, each of a moving direction of the lens and a movement amount of the lens may be detected from the one or more original images of the plurality of original images and the composite image. The AF model 115 may determine the focal length using the moving direction of the lens and the movement amount of the lens detected from the one or more original images, and the moving direction of the lens and the movement amount of the lens detected from the composite image.

In an example, when the moving direction of the lens detected from the one or more original images is the same as the moving direction of the lens detected from the composite image, the AF model 115 may determine the focal length using an average (or a weighted average) of the movement amount of the lens detected from the one or more original images and the movement amount of the lens detected from the composite image.

In an example, when the moving direction of the lens detected from the one or more original images is different from the moving direction of the lens detected from the composite image, the AF model 115 may determine the focal length based on the moving direction of the lens and the movement amount of the lens detected from the composite image. For example, when the moving direction of the lens detected from the one or more original images is different from the moving direction of the lens detected from the composite image, the electronic device 100 may recapture the plurality of original images using a camera, and determine the focal length using the plurality of recaptured original images.

Figure 4:
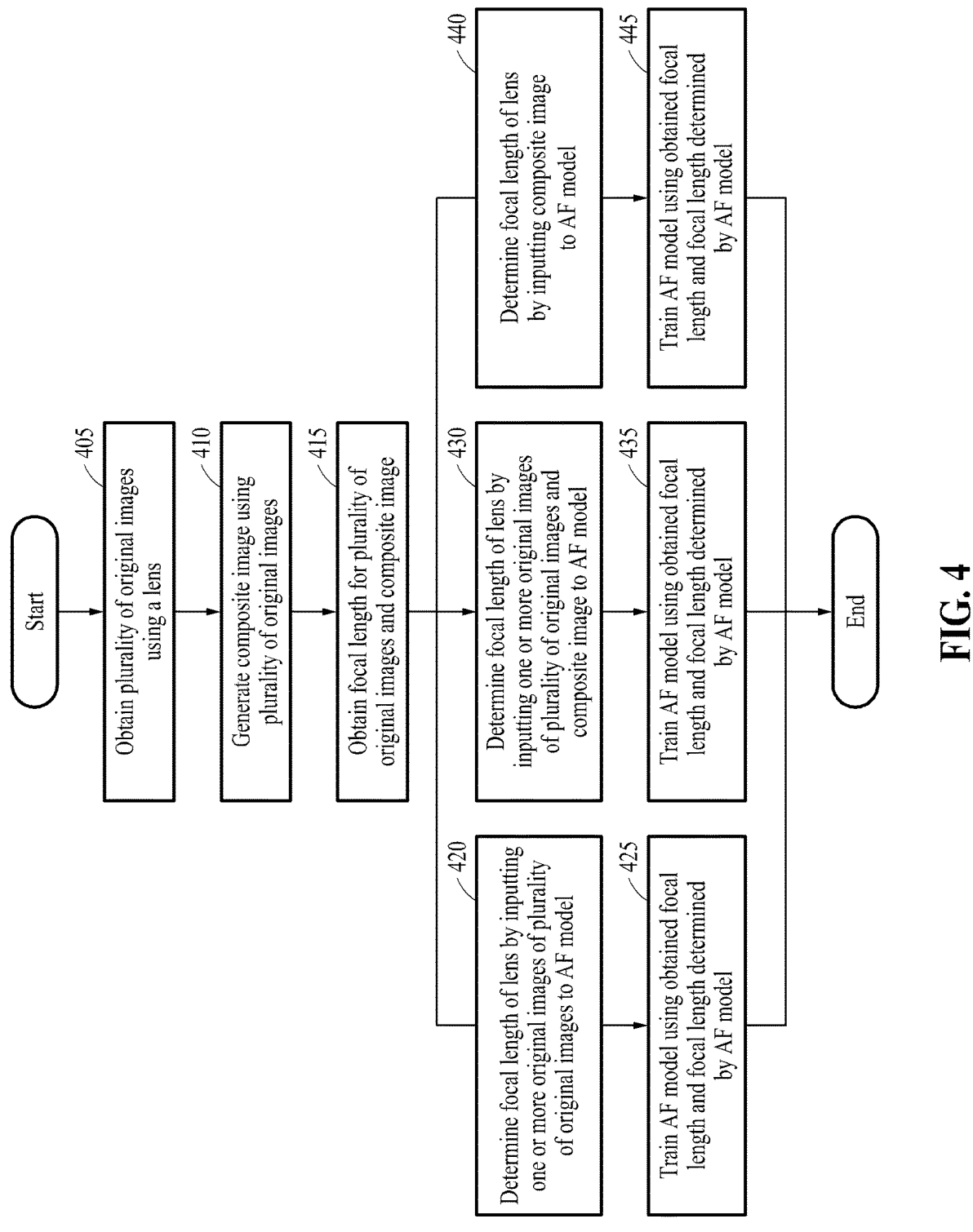
FIG. 4 illustrates an example operation of training an AF model, in accordance with one or more embodiments.

FIG. 4 illustrates an example operation of training the AF model 115, in accordance with one or more embodiments. The operations in FIG. 4 may be performed in the sequence and manner as shown. However, the order of some operations may be changed, or some of the operations may be omitted, without departing from the spirit and scope of the shown example. Additionally, operations illustrated in FIG. 4 may be performed in parallel or simultaneously. One or more blocks of FIG. 4, and combinations of the blocks, can be implemented by special purpose hardware-based computer that perform the specified functions, or combinations of special purpose hardware and instructions, e.g., computer or processor instructions. In addition to the description of FIG. 4 below, the descriptions of FIGS. 1-3 are also applicable to FIG. 4 and are incorporated herein by reference. Thus, the above description may not be repeated here for brevity purposes. The operations of FIG. 4 may be performed by a processor.

FIG. 4 illustrates an example in which the AF model 115 is trained by the electronic device 100, but is not limited to the example described with reference to FIG. 4, and in examples the AF model 115 may be trained by a training device, an external electronic device 100, or a server separate from the electronic device 100.

In operation 405, the electronic device 100 may obtain a plurality of original images using a lens.

In operation 410, the electronic device 100 may generate a composite image using the plurality of original images.

In operation 415, the electronic device 100 may obtain a focal length for the plurality of original images and the composite image. The focal length obtained in operation 415 may indicate a label of training data or ground truth to train the AF model 115. For example, the focal length may include a focal length calculated using a depth estimated from a multi-view stereo image, or calculated according to the CDAF method using the plurality of original images captured at a plurality of lens positions or the composite image. Since the focal length corresponding to the label of the training data or the ground truth is obtained in operation 415, the training of the AF model 115 may be easily performed.

In operation 420, the electronic device 100 may determine the focal length of the lens by inputting one or more original images of the plurality of original images to the AF model 115.

In operation 425, the electronic device 100 may train the AF model 115 using the obtained focal length and the focal length determined by the AF model 115.

For example, the AF model 115 trained in operations 420 and 425 may represent a model that is trained to output a focal length by inputting one or more original images of the plurality of original images.

In operation 430, the electronic device 100 may determine the focal length of the lens by inputting one or more original images of the plurality of original images and the composite image to the AF model 115.

In operation 435, the electronic device 100 may train the AF model 115 using the obtained focal length and the focal length determined by the AF model 115.

For example, the AF model 115 trained in operations 430 and 435 may represent a model that is trained to output a focal length by inputting one or more original images of the plurality of original images and the composite image.

In operation 440, the electronic device 100 may determine the focal length of the lens by inputting the composite image to the AF model 115.

In operation 445, the electronic device 100 may train the AF model 115 using the obtained focal length and the focal length determined by the AF model 115.

In an example, the AF model 115 trained in operations 440 and 445 may represent a model that is trained to output a focal length by inputting the composite image.

The AF model 115 may be trained by performing one of operations 420 and 425, operations 430 and 435, and operations 440 and 445 shown in FIG. 4. Additionally, in an example, the AF model 115 may be trained by performing two or more of operations 420 and 425, operations 430 and 435, and operations 440 and 445 together. In this example, a predetermined weight may be applied to the operations performed together and may affect the training of the AF model 115 at the same or different rates.

Figure 5:
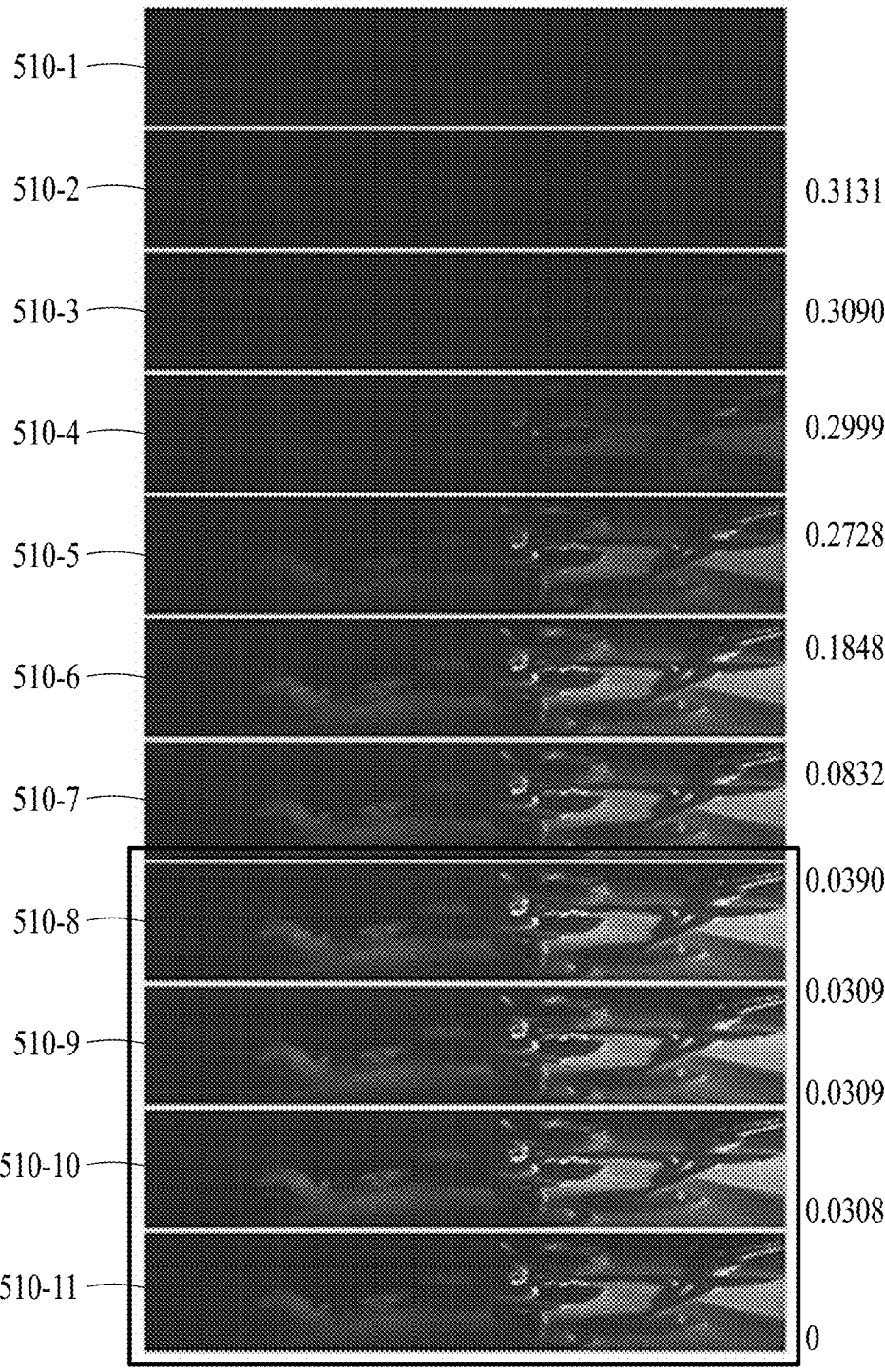
FIG. 5 illustrates an example error calculated by an example electronic device from a plurality of original images, in accordance with one or more embodiments.

FIG. 5 illustrates an example of an error calculated by the electronic device 100 from a plurality of original images, in accordance with one or more embodiments.

The electronic device 100 may calculate errors between an original image 510-11 of a reference frame (e.g., a last frame) selected from the plurality of original images 510-1, . . . , and 510-11, and the original images 510-1, . . . , and 510-10 of the remaining frames. When the plurality of original images are captured continuously, there may be differences between the plurality of original images due to a change in illuminance and movement of a subject. The image of the reference frame to be used to generate a composite image may be selected from the plurality of original images 510-1, . . . , and 510-11 as an image that satisfies predetermined conditions. For example, the image satisfying the predetermined conditions may include an image having highest sharpness, but may include images with various conditions for selecting an image in which a subject is clearly captured without shaking (e.g., images with the least noise) without limitation. In some examples, when images are captured continuously, a last image captured may be an image that is most clearly captured without shaking, and in this example, an image of a last frame may be selected as the image of the reference frame.

The electronic device 100 may calculate errors between the original image 510-11 of the reference frame and the original images 510-1, . . . , and 510-10 of the remaining frames. In an example, the electronic device 100 may calculate the errors except for the original image 510-1 of the first frame.

FIG. 5 illustrates that the error between the original image 510-11 of the reference frame and the original image 510-10 of a tenth frame is 0.0308. It may be confirmed that the error of the original image 510-10 of a tenth frame is the smallest among the errors of the original images 510-2, . . . , and 510-10. The electronic device 100 may determine the error of the original image 510-10 of the tenth frame as a reference error. The electronic device 100 may generate a composite image by using the original images 510-8, 510-9, and 510-10 having the errors of the original images within a set value (e.g., 0.001) or range (e.g., 5%) from the reference error, and the original image 510-11 of the reference frame. As described above, since the composite image is generated based on the original image of the reference frame that is most clearly captured, and the original images having the errors from the original image of the reference frame within a threshold value, the electronic device 100 may effectively obtain the composite image in which a subject is clearly captured without shaking, and may obtain the focal length of the lens with high accuracy from the AF model using the composite image.

Figure 6:
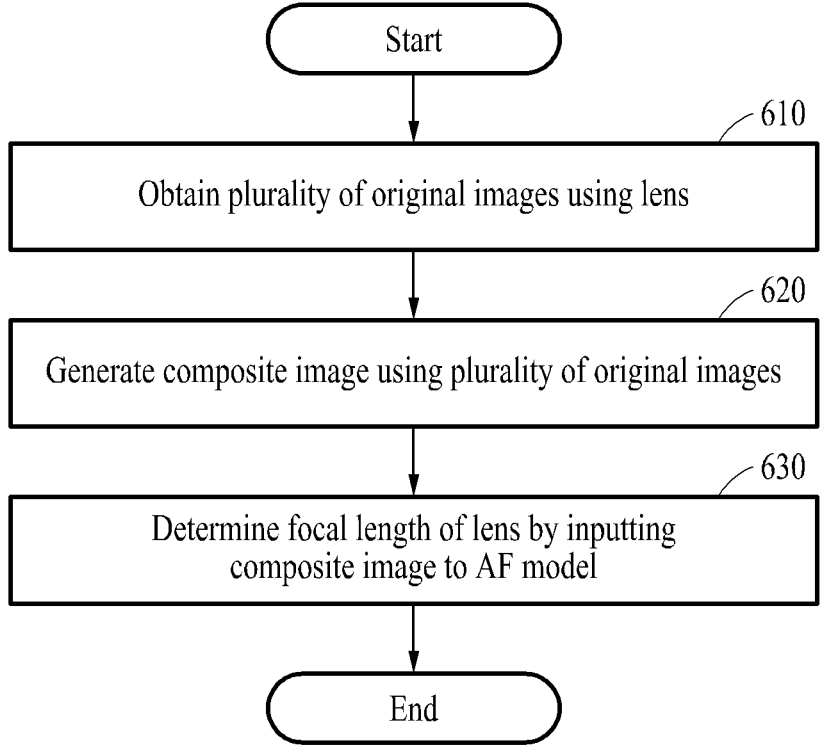
FIG. 6 illustrates an example method of determining a focal length, in accordance with one or more embodiments.

FIG. 6 illustrates an example of a method of determining a focal length, in accordance with one or more embodiments. The operations in FIG. 6 may be performed in the sequence and manner as shown. However, the order of some operations may be changed, or some of the operations may be omitted, without departing from the spirit and scope of the shown example. Additionally, operations illustrated in FIG. 6 may be performed in parallel or simultaneously. One or more blocks of FIG. 6, and combinations of the blocks, can be implemented by special purpose hardware-based computer that perform the specified functions, or combinations of special purpose hardware and instructions, e.g., computer or processor instructions. In addition to the description of FIG. 6 below, the descriptions of FIGS. 1-5 are also applicable to FIG. 6 and are incorporated herein by reference. Thus, the above description may not be repeated here for brevity purposes. The operations of FIG. 6 may be performed by a processor.

Referring to FIG. 6, in operation 610, the electronic device 100 may obtain a plurality of original images with the operation of a lens.

In operation 620, the electronic device 100 may generate a composite image using the plurality of original images.

The description of operations 310 and 320 of FIG. 3 may apply to operations 610 and 620 substantially in the same manner.

In operation 630, the electronic device 100 may determine a focal length of a lens by inputting the composite image to the AF model 115.

In an example, the AF model 115 may determine the focal length from the composite image according to the CDAF method or the PDAF method.

In an example, the AF model 115 may represent a model that is trained to output a focal length by inputting a composite image.

The electronic device 100, memory 110, AF model 115, processor 120, camera 130, and other components and devices of FIGS. 1-6, and other circuitries, components or devices described herein are implemented as, and by, hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to control the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods that perform the operations described in this application, and illustrated in FIGS. 1-6, are performed by computing hardware, for example, by one or more processors or computers, implemented as described above executing instructions or software to control the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller, e.g., as respective operations of processor implemented methods. One or more processors, or a processor and a controller, may perform a single operation, or two or more operations.

Instructions or software to control computing hardware, for example, one or more processors or computers, to control the neural network circuits or circuitry to perform the methods as described above may be written as computer programs, code segments, instructions or any combination thereof, for individually or collectively instructing or configuring the one or more processors or computers to operate as a machine or special-purpose computer to perform such control of the operations that be performed by the neural network circuits or circuitry and the methods as described above. In one example, the instructions or software include machine code that is directly executed by the one or more processors or computers, such as machine code produced by a compiler. In another example, the instructions or software include higher-level code that is executed by the one or more processors or computers using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the control of hardware components to perform the methods as described above, and any associated data, data files, and data structures, may be recorded, stored, or fixed in or on one or more non-transitory computer-readable storage media, such as in memory 20 of FIG. 1. Examples of a non-transitory computer-readable storage medium include read-only memory (ROM), random-access programmable read only memory (PROM), EEPROM, RAM, DRAM, SRAM, flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors and computers so that the one or more processors and computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

As described above, although the examples have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above disclosure, the scope of the disclosure may also be defined by the claims and their equivalents, and all variations within the scope of the claims and their equivalents are to be construed as being included in the disclosure.

What is claimed is:

1. An electronic device, comprising:
a processor;
a camera comprising a lens; and
a memory configured to store one or more instructions executable by the processor,
wherein the processor is configured to:
receive a plurality of original images with the lens in response to the one or more instructions being executed;

US 12,675,862 B2

19 generate a composite image based on the plurality of
original images; and
determine a focal length of the lens by inputting one or
more original images of the plurality of original images
and the composite image to an autofocus (AF) model,
wherein the generating of the composite image comprises
calculating an error between an original image of a
reference frame selected from the plurality of original
images and original images of remaining frames, and
generating the composite image based on original
images which have the error within a set threshold
value and the original image of the reference frame.

2. The electronic device of claim 1, wherein the processor
is further configured to:
calculate the error based on a pixel value of the original
image of the reference frame and pixel values of the
original images of the remaining frames.

3. The electronic device of claim 1, wherein the processor
is further configured to:
correct the plurality of original images by frame align-
ment; and
generate the composite image based on the plurality of
corrected original images.

4. The electronic device of claim 1, wherein the AF model
is a convolutional neural network (CNN) that comprises a
plurality of layers,
wherein the CNN is configured to receive one or more of
the plurality of original images and a composite image
generated from the plurality of original images, and
output a focal length for the composite image.

5. The electronic device of claim 1, wherein the AF model
is configured to:
determine the focal length by detecting a contrast of the
composite image, or determine the focal length based
on a phase difference of the composite image.

6. An electronic device, comprising:
a processor;
a camera comprising a lens; and
a memory configured to store one or more instruction,
executable by the processor,
wherein the processor is configured to:
receive a plurality of original images with the lens in
response to the one or more instructions being
executed;
generate a composite image based on the plurality of
original images; and
determine a focal length of the lens by inputting the
composite image to an autofocus (AF) model,
wherein the generating of the composite image comprises
calculating an error between an original image of a
reference frame selected from the plurality of original
images and original images of remaining frames, and
generating the composite image based on original
images which have the error within a set threshold
value and the original image of the reference frame.

7. The electronic device of claim 6, wherein the processor
is further configured to:
calculate the error based on a pixel value of the original
image of the reference frame and pixel values of the
original images of the remaining frames.

8. The electronic device of claim 6, wherein the processor
is further configured to:
correct the plurality of original images by frame align-
ment; and
generate the composite image based on the plurality of
corrected original images.

20

9. The electronic device of claim 6, wherein the AF model
is a convolutional neural network (CNN) that comprises a
plurality of layers,
wherein the CNN is configured to receive one or more of
the plurality of original images and a composite image
generated from the plurality of original images, and
output a focal length for the composite image.

10. The electronic device of claim 6, wherein the AF
model is configured to determine the focal length by detect-
ing a contrast of the composite image, or determine the focal
length based on a phase difference of the composite image.

11. A focal length determining method, the method com-
prising:
receiving a plurality of original images with a lens;
generating a composite image based on the plurality of
original images; and
determining a focal length of the lens by inputting the
composite image to an autofocus (AF) model,
wherein the generating of the composite image comprises
calculating an error between an original image of a
reference frame selected from the plurality of original
images and original images of remaining frames, and
generating the composite image based on original
images which have the error within a set threshold
value and the original image of the reference frame.

12. The method of claim 11, wherein the calculating of the
error comprises:
calculating the error based on a pixel value of the original
image of the reference frame and pixel values of the
original images of the remaining frames.

13. The method of claim 11, wherein the generating of the
composite image comprises:
correcting the plurality of original images by frame align-
ment; and
generating the composite image based on the plurality of
corrected original images.

14. The method of claim 11, wherein the AF model is a
convolutional neural network (CNN), which comprises a
plurality of layers, and receives one or more of the plurality
of original images and a composite image generated from
the plurality of original images, and outputs a focal length
for the composite image.

15. The method of claim 11, wherein the determining of
the focal length comprises:
determining the focal length by detecting a contrast of the
composite image, or determining the focal length based
on a phase difference of the composite image using the
AF model.

16. A method, comprising:
capturing burst images at preset time intervals with an
image capturing device including one or more lenses;
calculating an error between an original image of a
reference frame of the burst images, and original
images of remaining frames of the burst images;
merging the burst images into a composite image by
comparing the calculated error with a set threshold;
inputting the composite image to an autofocus (AF)
model; and
determining a focal length of at least one of the one or
more lenses based on an output of the AF model,
wherein the AF model is at least one of a machine learning
model and a non-machine learning model.

17. The method of claim 16, wherein the machine learning model is a convolutional neural network model, and the non-machine learning model is one of a phase detection auto focus (PDAF) method and a contrast detection auto focus (CDAF) method.

* * * * *